United States Patent
Cideciyan et al.

(10) Patent No.: US 7,574,646 B2
(45) Date of Patent: Aug. 11, 2009

(54) DATA STORAGE SYSTEMS

(75) Inventors: Roy D. Cideciyan, Rueschlikon (CH); Ajay Dholakia, Gattikon (CH); Evangelos S. Eleftheriou, Zurich (CH); Thomas Mittelholzer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 11/286,582

(22) Filed: Nov. 25, 2005

(65) Prior Publication Data

US 2006/0107182 A1    May 18, 2006

(51) Int. Cl.
   *H03M 13/00* (2006.01)
(52) U.S. Cl. ...................... 714/755; 714/756
(58) Field of Classification Search ............ 714/755, 714/756
   See application file for complete search history.

(56) References Cited

U.S. PATENT DOCUMENTS

| | | | |
|---|---|---|---|
| 5,825,744 A | 10/1998 | Hutchins et al. | |
| 6,185,175 B1 * | 2/2001 | Zook | 369/53.35 |
| 6,282,690 B1 * | 8/2001 | McClellan et al. | 714/801 |
| 6,427,220 B1 * | 7/2002 | Vityaev | 714/781 |
| 6,429,986 B1 | 8/2002 | Blaum et al. | |
| 6,504,493 B1 * | 1/2003 | Burd | 341/50 |
| 6,513,141 B1 * | 1/2003 | Livingston | 714/792 |
| 6,516,443 B1 * | 2/2003 | Zook | 714/792 |
| 6,530,060 B1 * | 3/2003 | Vis et al. | 714/792 |
| 2003/0005223 A1 | 1/2003 | Coulson et al. | |
| 2003/0101410 A1 | 5/2003 | Betti et al. | |

FOREIGN PATENT DOCUMENTS

| | | |
|---|---|---|
| EP | 0786772 A2 | 3/1997 |
| JP | 05314676 A | 11/1993 |
| JP | 2000067531 | 3/2008 |
| WO | 98014865 | 4/1998 |

OTHER PUBLICATIONS

IEEE Transactions on Magnetics, US, Mar. 2001, vol. 37, No. 2, p. 695-703, "A Concatenated Coding Technique for Partial Response Channels," Hideki Sawaguchi.
Examination Report for Application 200507471-1 mailed Dec. 12, 2008.

* cited by examiner

*Primary Examiner*—Joseph D Torres
(74) *Attorney, Agent, or Firm*—Cantor Colburn LLP

(57) ABSTRACT

A method for decoding data in a data storage system includes generating an output bit stream; generating a first error corrected bit stream in dependence on the output bit stream; generating a second error corrected bit stream in dependence on the first error corrected bit stream; generating a checksum in dependence of the second error corrected bit stream; and, in the event that the checksum is indicative of errors in the second error corrected bit stream and the second error corrected bit stream comprises at least one correct interleave: supplying data indicative of locations of correct bits in the second error corrected bit stream; and, regenerating the first error corrected bit stream in dependence on the pinning data.

1 Claim, 5 Drawing Sheets

DATA STORAGE SYSTEMS

FIELD OF THE INVENTION

The present invention generally relates to data storage systems and particularly relates to apparatus and methods for decoding data in a data storage system.

BACKGROUND ART

Referring to FIG. 1, a typical data storage system comprises: an encoding subsystem 1; a decoding subsystem 2; and, a storage subsystem 3. The storage subsystem 3 comprises a storage medium such as a magnetic tape or disk, a read/write transducer for reading data from and writing data to the storage medium, and a drive system for moving the storage medium relative to the transducer. The storage medium and transducer may be alternatively implemented via optical technology. The encoding subsystem 1 transforms raw data from a user device such as a data processing system into a form compatible with the storage subsystem 3. Error correction data is typically added to the data recorded by the storage subsystem 3 during the encoding transformation. The decoding subsystem 2 transforms data read from the storage subsystem 3 back into the user data. The error correction data is employed by the decoding subsystem 2 to correct errors in the data read back by the storage subsystem 3.

Data storage systems usually have stringent reliability specifications. It is desirable to meet these specifications with cost-effective data detection and decoding. Accordingly, it is desirable to keep the implementation complexity of the decoding subsystem 2 to a minimum while maximizing performance.

Referring to FIG. 2, a typical decoding subsystem 2 for a data storage system employs a cascade of processing steps. A popular approach comprises a data detector 10 followed by an error correcting code (ECC) decoder 20. The decoder 20 may have a plurality of ECC codes.

Referring to FIG. 3, in an typical example of a decoding subsystem 2, a soft-decision based parity post processor 30 is disposed between the detector 10 and the decoder 20. A combination of data detection, inner modulation/parity codes, and outer interleaved Reed-Solomon codes is typically employed to meet the aforementioned reliability requirements.

The inner parity based coding provides performance improvement with a limited increase in implementation complexity. The data detector 10 typically employs sequence detection based on the Viterbi algorithm. The error rate at the output of the detector is improved by the post-processor 30.

In use, the post processor 30 exploits modulation and parity constraints of the inner coding. The post processor 30 receives decisions from the output of the detector 10. The post processor 30 also receives soft information from the input to the detector 10 via a feed forward link 40. The decoder 20 processes the output of the post processor using Reed Solomon codes to correct remaining errors via the outer ECC.

Errors remaining in the data after processing by the detector 10 and the post-processor 30 typically appear as bursts of various lengths. The bursts are usually broken up by the decoder 20 via multiple interleaved outer ECC code words. Various interleaving schemes are possible, depending on the length and frequency of occurrence of the bursts. Multiple levels of outer codes may be employed to further enhance the error correction capability of the system. Typically, a cyclic-redundancy-check (CRC) code is applied to detect the presence of any remaining errors in the data.

The data detection, inner decoding, and outer decoding are typically performed in a sequential, feed forward manner as shown in FIGS. 2 and 3 and generally referred to as "On The Fly" mode. In On The Fly mode, contiguous portions of recorded data are read back and processed such that decoded data is delivered at a steady data rate. This requires the detection, inner coding, and outer decoding, to be completed before the next portion of data read is processed. Thus, a careful tradeoff between performance and complexity of the detector 10 and the decoder 20 is preferable.

If the final CRC code indicates that errors remain outstanding, an elaborate "Off Line" data recovery procedure is typically initiated. This procedure is usually referred to as Off Line mode. The On The Fly mode is then interrupted, reducing the throughput of the decoding subsystem 2. The aforementioned reliability requirements necessitate exhausting all data recovery possibilities before declaring a failure. The Off Line mode may involve so-called erasure decoding of the outer codes, together with rereading and reprocessing the recorded data.

Performance improvement can be obtained by more complexity in the detector 10, post-processor 30, outer interleaved codes, and decoder 20. However, additional complexity is undesirable. Referring to FIG. 4, the performance of the detector 10 and decoder 20 may be improved by feedback 50 of the outer decoding to the detector 10 if at least one of the outer interleaved ECC code words is correctly decoded. For each correct deinterleaved outer code word, bits at corresponding positions in the interleaved data stream can be fixed or "pinned" to their correct or known values. This partially correct data stream can be reprocessed by the detector 10. Knowledge of the location and value of correct bits limits the number of possible sequences to be tracked by the detector 10 and hence improves performance. This is particularly useful for data storage systems in which the dominant noise at high recording densities is transition or media noise. In such cases, the randomness of the noise cannot be exploited by averaging many observations. Therefore, additional information relating to the correctness of specific bits in specific locations is beneficial. Use of such feedback from outer interleaved Reed-Solomon codes to inner convolutional codes is proposed for deep space applications in E. Paaske, "*Improved decoding for a concatenated coding system recommended by CCSDS,*" IEEE Trans. Commun., vol. COM-38, pp. 1138-1144, August 1990 and O. Collins and M. Hizlan, "*Determinate state convolutional codes,*" IEEE Trans. Commun., vol. 41, no. 12, p. 1785-1794, December 1993. An application of this concept to data storage is described in J. Miller and J. K. Wolf, "*High code rate error correction code design for partial response systems,*" IEEE Trans. Magnetics, vol. 37, no. 2, pp. 704-707, March 2001, where only an inner data detector and outer interleaved RS coding is used. An additional bit-interleaving step intersperses coded and uncoded user bits. Feedback from the corrected outer code word recovers the uncoded bits. However, the performance gain available from such a scheme is limited. Referring now to FIG. 5, another application of this concept to data storage is described in H. Sawaguchi, S. Mita, and J. K. Wolf, "*A concatenated coding technique for partial response channel,*" IEEE Trans. Magnetics, vol. 37, no. 2, pp. 695-703, March 2001. Here, the feed forward link 40 from the input of the detector 10 to the post processor 30 provides forward processing. ECC feedback 50 is provided from the output of the decoder 20 to the detector 10.

A conventional example of the post-processor 30 is described in R. D. Cideciyan, J. D. Coker, E. Eleftheriou, and R. L. Galbraith, "*Noise predictive maximum likelihood detec-*

*tion combined with parity-based post-processing,*" IEEE Trans. Magnetics, vol. 37, no. 2, pp. 714-720, March 2001.

An alternative approach to decoding the inner parity code involves combining the decoding and detection. Sequence detection and parity code trellises may be combined to form a joint "super-trellis". The Viterbi algorithm may be applied to perform combined detection and decoding. However, the number of states in the super-trellis grows exponentially, and implementation complexity becomes prohibitive. For example, a detector for a degree-K generalized partial response polynomial combined with a parity code with m parity bits requires a $2^{(K+m)}$-state trellis. A parity post-processor alleviates this problem by separating the decoding and detection.

The post processor 30 and the detector 10 operate differently. Furthermore, design of the parity post-processor 30 involves careful selection of various parameters such as the number of dominant error events to be detected, the parity code, the size of the list of most likely error events to be checked, etc.

It would be desirable to improve the performance of decoding subsystems for data storage systems.

SUMMARY OF THE INVENTION

In accordance with the present invention, there is now provided a method for decoding data in a data storage system, the method comprising: generating by a detector an output bit stream in dependence on a data block received from a storage subsystem of the data storage system; generating by a post processor connected to the detector a first error corrected bit stream in dependence on the output bit stream and the data block; generating by an error correction decoder connected to the post processor a second error corrected bit stream in dependence on the first error corrected bit stream; generating by the error correction decoder a checksum in dependence of the second error corrected bit stream; and, in the event that the checksum is indicative of errors in the second error corrected bit stream and the second error corrected bit stream comprises at least one correct interleave: supplying from the error correction decoder to the post processor pinning data indicative of locations of correct bits in the second error corrected bit stream; and, regenerating by the post processor the first error corrected bit stream in dependence on the pinning data.

The regenerating preferably comprises discounting bits at the locations indicated by the pinning data. The pinning data may be indicative of locations and values of correct bits in the second error corrected bit stream. The method may comprise supplying the pinning data from the error correction decoder to the detector in the event that the checksum is indicative of errors in the second error corrected bit stream and the second error corrected bit stream comprises at least one correct interleave. The method may then comprise regenerating by the detector the output bit stream in dependence on the pinning data. The regenerating of the first error corrected bit steam may thus be performed in dependence on the pinning data and the regenerated output stream.

Erasure decoding may be performed in the error correction decoder to generate a third error corrected bit stream in the event that the checksum is indicative of an error in the second error corrected bit stream. The checksum is then regenerated in dependence of the third error corrected bit stream. Alternatively erasure decoding may be performed to generate a third error corrected bit stream in the event that the checksum is indicative of an error in the second error corrected bit stream and the second error corrected bit stream comprises at least one correct interleave. The checksum may then be regenerated again in dependence of the third error corrected bit stream. In either case, a hard error may be signaled in the event that the regenerated checksum is indicative of error in the third error corrected bit stream.

Viewing the present invention from another aspect, there is provided apparatus for decoding data in a data storage system, the apparatus comprising: a detector for generating an output bit stream in dependence on a data block received from a storage subsystem of the data storage system; a post processor connected to the detector for generating a first error corrected bit stream in dependence on the output bit stream and the data block; an error correction decoder connected to the post processor for generating a second error corrected bit stream in dependence on the first error corrected bit stream and, for generating a checksum in dependence of the second error corrected bit stream; and, a feedback path for supplying from the error correction decoder to the post processor pinning data indicative of locations of correct bits in the second error corrected bit stream in the event that the checksum is indicative of errors in the second error corrected bit stream and the second error corrected bit stream comprises at least one correct interleave, the post processor regenerating the first error corrected bit stream in dependence on the pinning data received from the error correction decoder.

The apparatus may further comprise: a modulation decoder having an input connected to the output of the post processor and an output connected to the input of the error correction decoder; and a modulation encoder in the feedback path between the error correction decoder and the post processor.

The present invention also extends to a data storage system comprising an encoder subsystem for encoding data block for storage; a storage subsystem connected to the encoder subsystem for writing the encoded data blocks on a data storage medium and for reading the encoded data blocks from the data storage medium; and, a decoding subsystem comprising apparatus as herein before described for decoding the encoded data blocks.

The present invention advantageously improves the performance of decoding subsystems for data storage systems such as magnetic tape drives, disk drives, and the like.

As herein before described, there is a trend in data storage decoding subsystem technology towards inclusion of parity codes in inner coding schemes and use of soft-decision parity based processing in the post-processor 30 to decode them. Maximizing the performance gain of such schemes is highly desirable. In a preferred embodiment of the present invention, performance is improved by providing feedback from correctly decoded outer ECC code words to the post-processor 30.

In a preferred embodiment of the present invention to be described shortly, there is provided a method for inner data detection and soft decision parity based post processing that can be used in conjunction with feedback from correctly decoded outer ECC code words.

In a particularly preferred embodiment of the present invention, the post processor 30 is modified to accept ECC feedback information during a second pass. Specifically, error events at least partially spanning those bit positions known to be correct are discarded from consideration. This modification optimizes the list of likely error events to be worked on by the post-processor and thus improves performance. Additionally, the error signal corresponding to at least some of the known bit positions may be zeroed out or otherwise favorably altered to further facilitate processing in the second pass.

An advantage of the present invention is that the type and amount of feedback information generated by the outer ECC decoder may be flexibly determined. One possibility is to provide both the location and values of correct bit positions. Alternatively, only the location of correct bit positions may be supplied. This greatly reduces the amount of feedback needed. Partial feedback of this nature may be insufficient where the detector 10 is of a form where the values of corrected bits are also required. However, partial feedback remains useful in the post-processor 30 because it allows receivers for individual error events to select other locations as most likely locations of the error event. Coupled with the parity checking by the post-processor 30, a gain in performance may be realized.

Another advantage of the proposed scheme is that it can be used with the detector 10 using the ECC feedback information. If the data stream used by the post processor 30 in the second pass has also been preprocessed by the detector, the post processor 30 benefits.

The present invention is applicable to both On The Fly and Off Line decoding modes. This allows a flexible design tradeoff between performance, implementation complexity, and operating mode. When multiple outer ECC codes are used, more refined feedback information can be provided to the post-processor 30. Thus, additional gains in performance are possible.

THE FIGURES

Preferred embodiments of the present invention, will now be described, by way of example only, with reference to the accompanying drawings, in which.

DETAILED DESCRIPTION OF THE INVENTION

Figure 1:
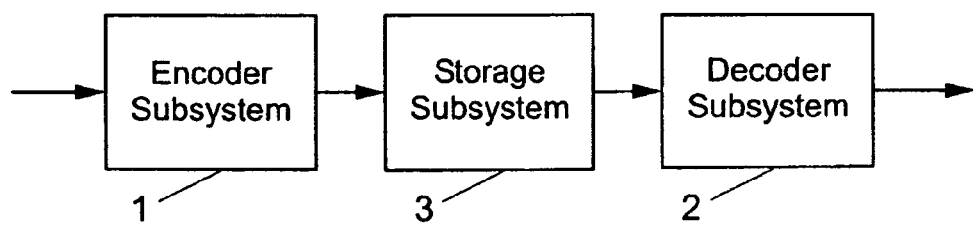
FIG. 1 is a block diagram of a data storage system.
Figure 2:
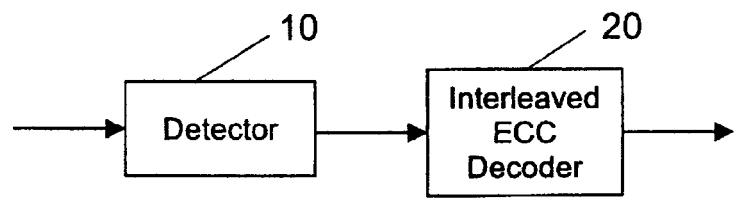
FIG. 2 is a block diagram of a conventional decoding subsystem for the data storage system.
Figure 3:
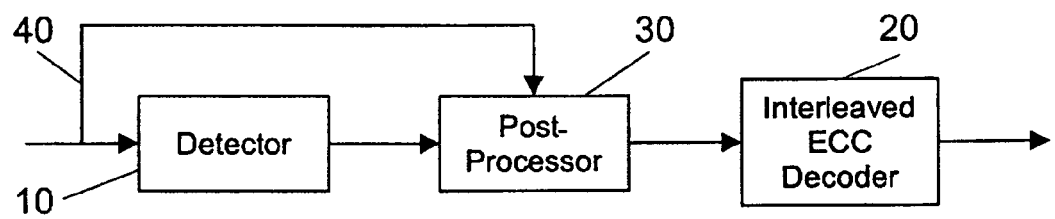
FIG. 3 is a block diagram of another conventional decoding subsystem.
Figure 4:
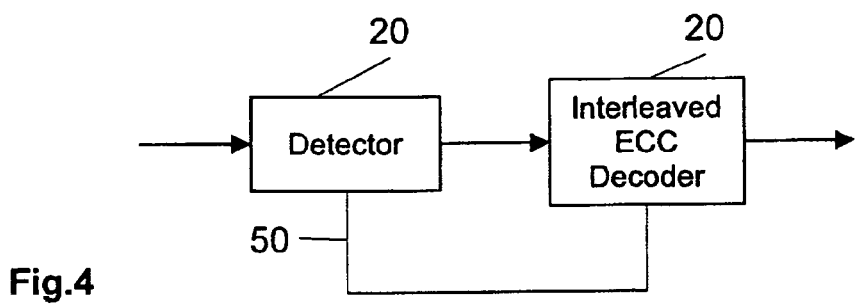
FIG. 4 is a block diagram of yet another conventional decoding subsystem.
Figure 5:
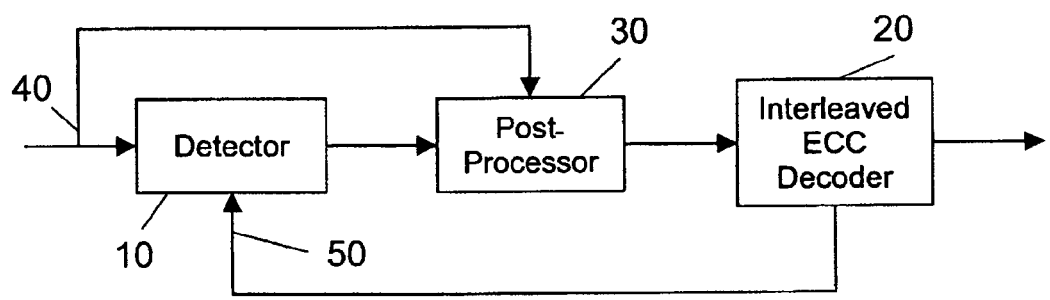
FIG. 5 is a block diagram of a further conventional decoding subsystem.
Figure 6:
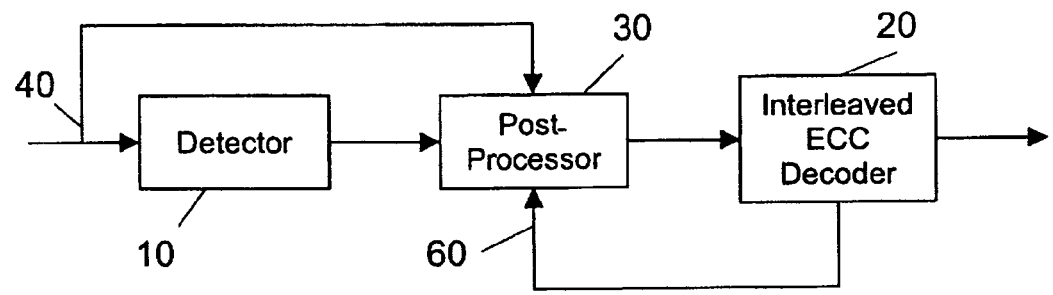
FIG. 6 is a block diagram of a decoding subsystem embodying the present invention.

Referring to FIG. 6, in an example of a data storage system embodying the present invention, the decoding subsystem 2 comprises the detector 10, decoder 20, and parity based post processor 30. The output of the detector 10 is connected to the input of the decoder 20 via the post processor 30. A feed forward path 40 extends from the input of the detector 10 to the post processor 30. A feedback path 60 extends from the decoder 20 to the post processor 30. The post processor 30 is modified to take into account ECC feedback information fed back from the decoder 20 via the feedback path 60.

In operation, the post processor 30 corrects dominant error events observed at the output of the detector 10. The post processor 30 may be based on the "one-shot" receiver principle of communication theory. See the aforementioned Cideciyan et al. reference. Dominant error events to be detected are treated as the "intended messages" observed in the presence of colored noise. The post processor 30 has a separate receiver for each of the dominant error events. The output of each receiver is the likelihood of occurrence of the corresponding error event and its location in the code word. A preferred receiver comprises a noise-whitening filter followed by a matched filter. The noise whitening is performed on an error signal derived from the output of an equalizer and bit decisions generated by the detector 10. In a preferred embodiment of the present invention, the outputs of the receivers are compared. The most likely error event is selected. A further check may be made to confirm that correcting the error event satisfies constraints of the inner parity code. The post processor 30 offers an advantage here. If the parity constraints are met, the detected data stream is corrected according to the selected error event. Otherwise, the next most likely error event is checked with respect to the parity constraint. This process continues until an error event satisfying the parity constraints is found or the list of likely error events is exhausted.

In operation, each block of data read from the storage subsystem 3 by the decoding subsystem 2 is subject to a first decoding pass, in which the decoder 20 performs a CRC checksum to determine if the block was successfully decoded. If so, the next data block is read for decoding. If not, "pinning" feedback information is returned from the decoder 20 to the post processor 30 via the feedback link 60 in preparation for a second decoding pass of the data block.

In another embodiment of the present invention, there is additionally provided a feedback path 50 extending from the decoder 20 to the detector 10.

Figure 8:
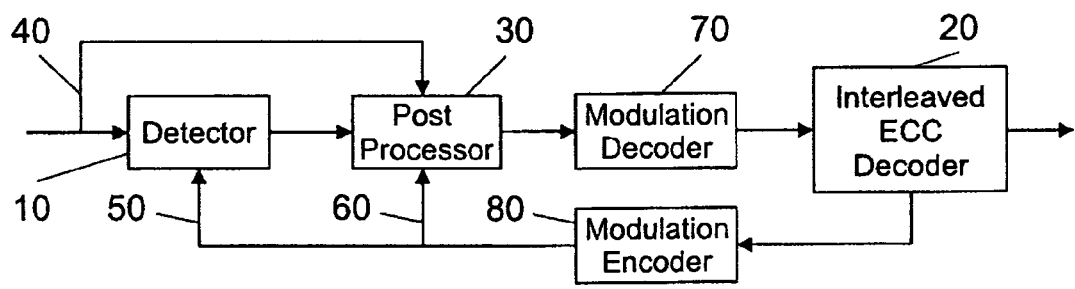
FIG. 8 is a block diagram of yet another decoding subsystem embodying the present invention.

In some data storage systems, the encoder subsystem 1 comprises a modulation encoder for encoding user data following ECC encoding and preceding inner parity encoding. Accordingly, referring now to FIG. 8, in another embodiment of the present invention, a modulation decoder 70 is provided between the output of the post processor 30 and the input of the decoder 20. A modulation encoder 80 is provided in the feedback paths from the decoder 20 to the post processor 30 and the detector 10. The feedback from the decoder 20 is re-encoded by the modulation encoder 80 prior to use in the post processor 30 and the detector 10 in the second pass.

Figure 9:
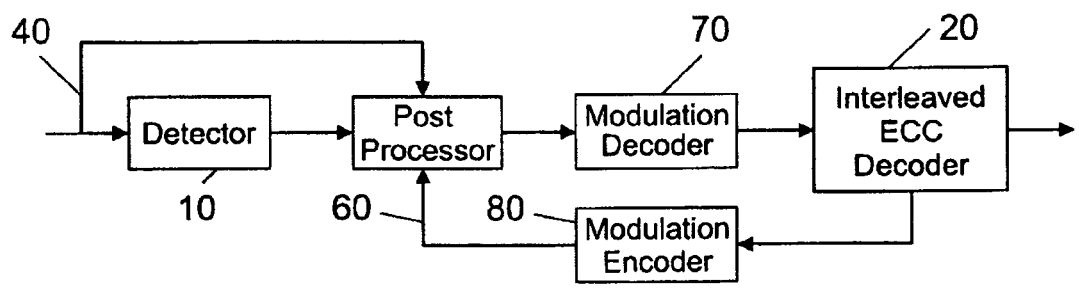
FIG. 9 is a block diagram of a further decoding subsystem embodying the present invention.

Referring to FIG. 9, in another embodiment of the present invention, only the post processor 30 receives ECC feedback information from the decoder 20. Accordingly, the feedback path 50 to the detector 10 is omitted. This leads to a reduction in implementation complexity because the detector 10 does not perform a second pass of processing.

Operation of the decoding subsystem 2 herein before described with reference to FIG. 6 will now be described with reference to FIG. 10. At block 100, a data block is read from the storage subsystem 3 to the detector 10 of the decoding subsystem 2. At block 120, the detector 10 in combination with the post processor 30 produce a corrected bit stream from the data block. At block 130, the decoder 20 performs error correction. At block 140, the decoder 20 tests the CRC checksum.

If the CRC checksum indicates no errors, then at block 210, the decoder 20 passes the data block as successfully decoded following the first processing pass. The next data block is then read from the storage subsystem 3 for decoding.

If the CRC checksum indicates an error, then the second processing pass of the data block is made. At block 150, the decoder 150 determines if at least one interleaved error was corrected. If at least one interleaved error was corrected, then, at block 160, the decoder 20 extracts pinning information from the corrected data. The pinning information comprises the location of correct bits in the data block. The pinning information is sent by the decoder 20 to the post processor 30 via the feedback link 60.

If at least one interleaved error was not corrected, then the decoding subsystem 2 enters Off Line mode. At block 170, the decoder 20 performs erasure decoding. Following erasure decoding, at block 180, the decoder 20 tests the CRC checksum.

If the checksum indicates no errors, then, at block 210, the decoder 20 indicates that the block was successfully decoded. However, if the checksum indicates an error, then at block 200, the decoder 20 determines if all erasure shifts have been made. If all erasure shifts have been made, then, at block 220, the decoder determines that the decoding of the block was unsuccessful. A hard error is returned. The erasure decoding involves a sweep action moving through bits in the data block. If erasure shifts remain to be made, then at block 190, the decoder 20 determines if at least one interleaved error was corrected.

Again, if at least one interleaved error was corrected, then, at block 160, the decoder 20 extracts pinning information from the corrected data. Again, the pinning information comprises the location of correct bits in the data. The pinning information is again sent by the decoder 20 to the post processor 30 via the feedback link 60. The post processor 30 performs another pass of the data block taking account of the pinning information received.

If at least one interleaved error was not corrected, then, at block 170, the decoder 20 again performs erasure decoding.

On receipt of the pinning information, the post processor 30 performs a second pass of the data block, again following steps 140 to 220, but now excluding the bits identified by the pinning information as being correct. For the post processor 30 to operate in the second pass, it will be appreciated that decoding process may involve temporarily storing data samples derived from the equalizer output and bits output from the detector 10 in the decoding subsystem 2.

Based on the process herein before described with reference to FIG. 10, errors fully contained in those bit positions known to be correct after the first pass are discarded from consideration by the post processor 30 in the second pass. Errors partially located in correct bit positions may be also discarded by the post processor 30. In this case, neighboring bits may also be affected. The pinning information allows the post processor 30 to exclude these positions from further consideration. This reduces the number likely errors to be reviewed by the post processor 30 and thus enhances performance.

Figure 10:
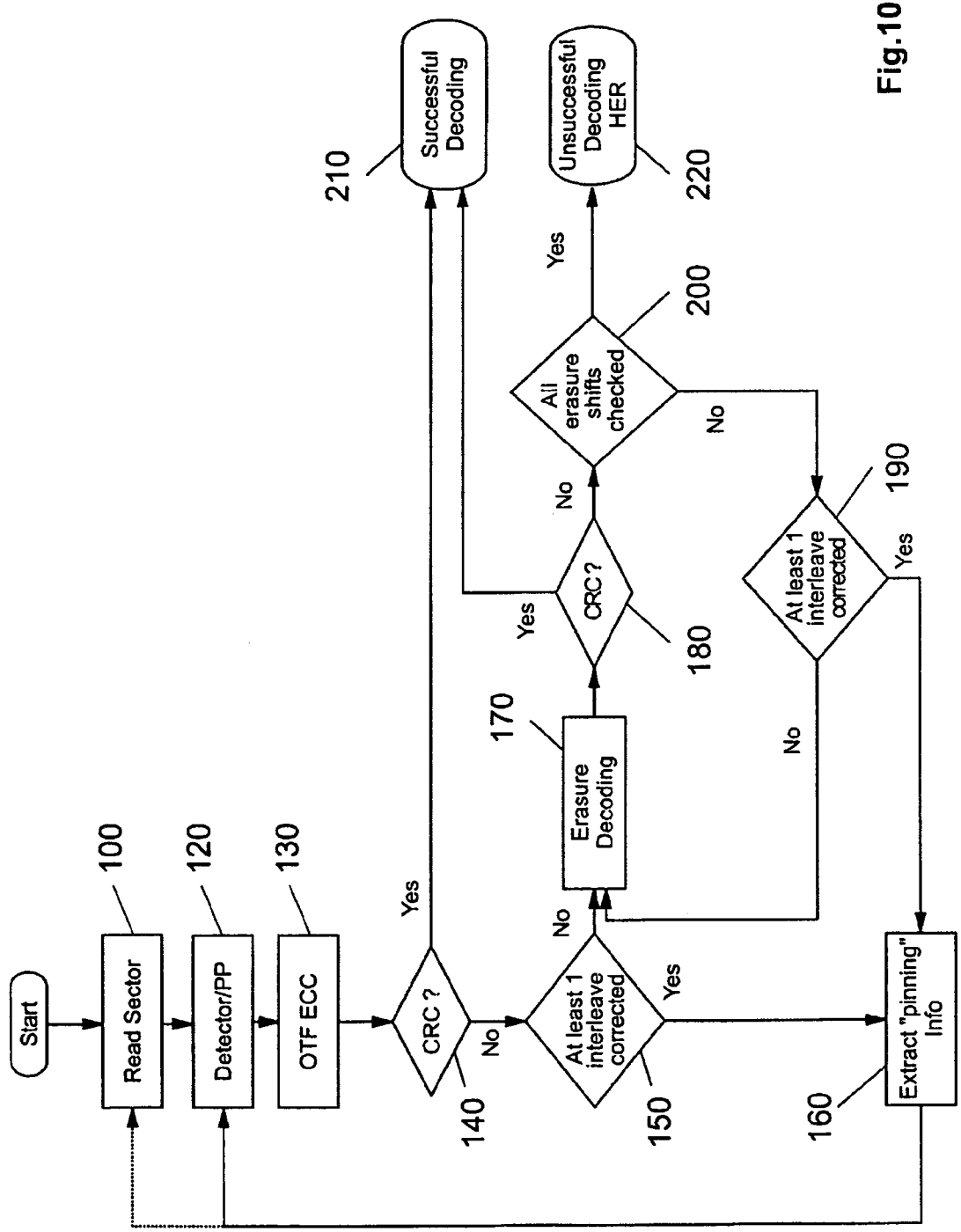
FIG. 10 is a flow chart corresponding to the decoding subsystem shown in FIG. 6; and, FIG. 11 is another flow chart corresponding to the decoding subsystem shown in FIG. 6.

The example of the present invention herein before described with reference to FIG. 10 is applicable to both On The Fly and Off Line modes. However, some embodiments of the present invention may be limited to On The Fly mode. Equally, other embodiments of the present invention may be limited to Off Line mode. Latency requirements associated with the Off Line mode in some applications may be improved via the present invention because the number of block rereads can be reduced for the same target hard error rate.

Figure 11:
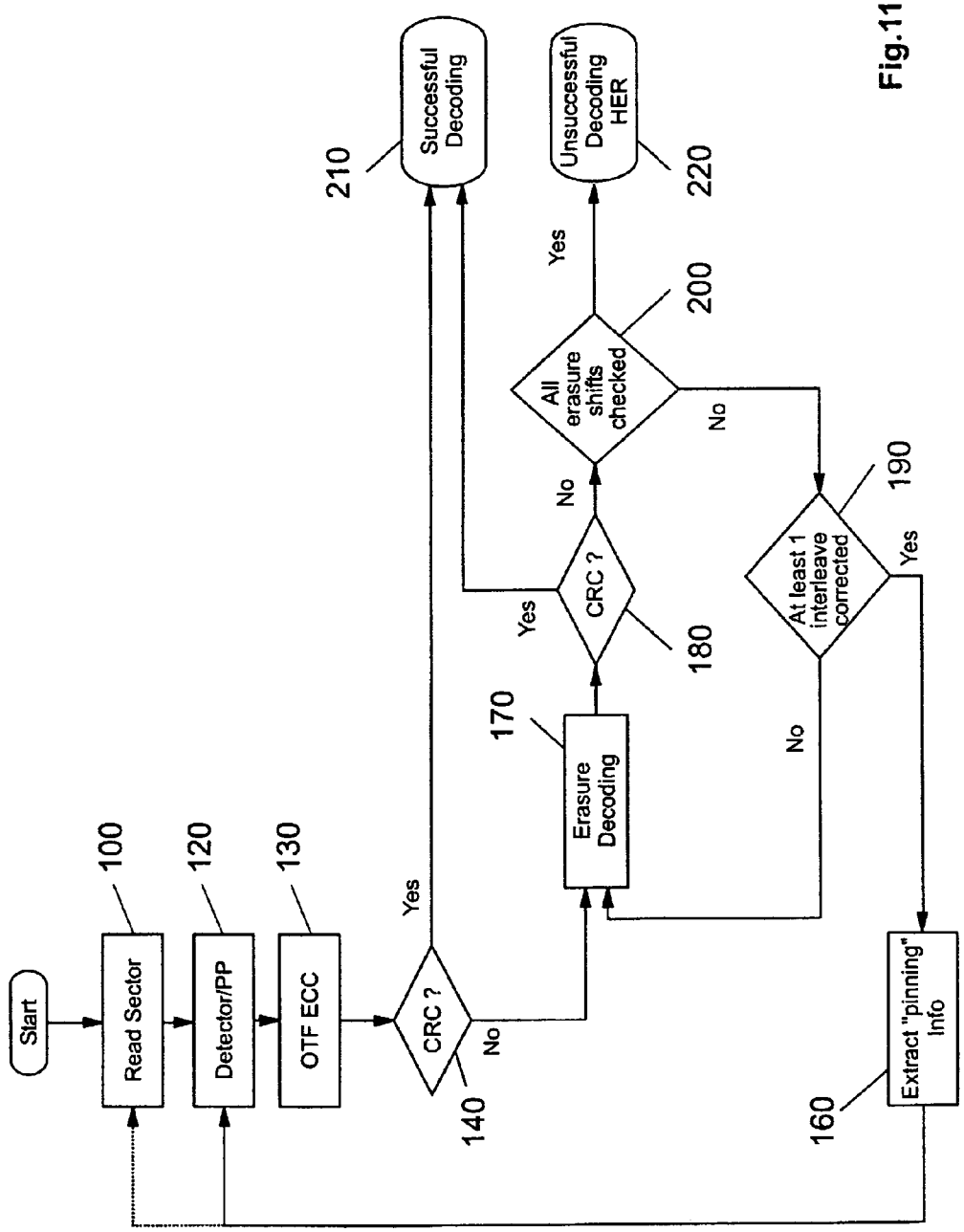

Referring now to FIG. 11, the Off Line only procedure comprises the same steps as herein before described with reference to FIG. 10, except for the test for at least one interleaved error at block 150.

Figure 7:
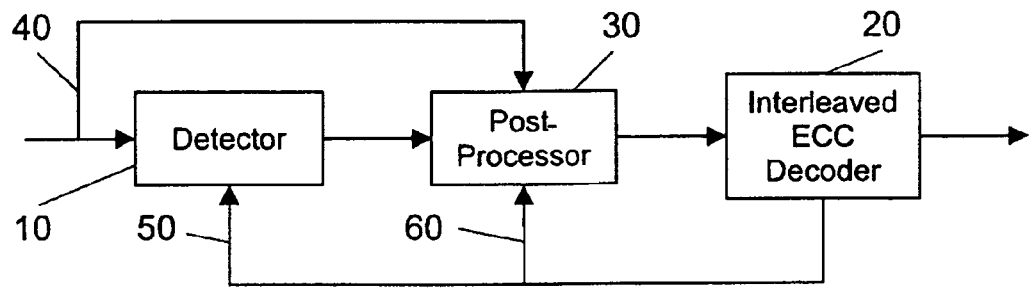
FIG. 7 is a block diagram of another decoding subsystem embodying the present invention.

In the embodiment of the present invention herein before described with reference to FIG. 7, the detector 10 also receives pinning information from the decoder 20. Here, the pinning information additionally comprises the value of the correct bits. This arrangement advantageously permits simplification of the aforementioned temporary storage step. Specifically, bits output from the detector 10 need not be stored if the detector 10 also performs a second processing pass to generate a new set of detected bits based on pinning information received via the feedback path 50 from the decoder 20 following the first pass. Errors corresponding to some or all bit positions known to be correct may be zeroed out or otherwise favorably altered in the detector 10, thereby further enhancing second pass processing in the post processor 30.

The present invention permits the type and amount of feedback information generated by the decoder 20 to be determined in a flexible manner, depending on the degree of involvement of the post processor 30 and the detector 10 in the second pass of processing data blocks. Similarly, the present invention permits optimization of the amount of temporary storage needed based on the degree to which the post processor 30 and the detector 10 participate in the second pass processing. The second pass of processing by the detector 10 and/or the post processor 30 permits correction of remaining errors, thereby eliminating the need for a reread. This improves both performance and throughput.

Pipe-lining may be employed to further improve throughput of a decoder system 2 embodying the present invention. Pipe-lining involves use of a second detector and/or second post processor. The second detector and/or second post processor are employed in the second pass. Meanwhile, the first detector and/or first post processor begin processing the next block of data read from the storage subsystem 3.

In another preferred embodiment of the present invention, the pinning information is used only in Off Line mode. When the decoding subsystem 2 enters this mode, reading of recorded data is suspended. More time is thus available for reprocessing data read back. The second processing pass by the detector 10 and/or post processor 30 may be performed only in Off Line mode. This leads to advantageous reductions in both implementation complexity and latency. Here, however, performance is not enhanced during operation in On The Fly mode.

The decoder 20 may maintain the list of most likely error events. Multiple error events may be corrected in the inner code word by the post processor 30. The output of the post processor 30 may be then fed to the decoder 20 for final error correction.

The present invention is applicable to many different data storage systems, including magnetic tape drives and optical or magnetic disk drives. It will be appreciated that the decoding subsystem 2 may be implemented in hardwired logic circuitry, software executing on one or more programmable processors, or a combination of hardwired and logic circuitry and software executing on one or more programmable processors. In the embodiments of the present invention herein before described, data is read by the decoding subsystem 2 in blocks. Such blocks may correspond to sectors on a disk or similar divisions on a tape.

The invention claimed is:

1. A method for decoding data in a data storage system, the method comprising:

generating by a detector an output bit stream in dependence on a data block received from a storage subsystem of the data storage system;

generating by a post processor connected to the detector a first error corrected bit stream in dependence on the output bit stream and the data block;

generating by an error correction decoder connected to the post processor a second error corrected bit stream in dependence on the first error corrected bit stream;

generating by the error correction decoder a checksum in dependence of the second error corrected bit stream;

in the event that the checksum is indicative of errors in the second error corrected bit stream and the second error corrected bit stream comprises at least one correct interleave: supplying from the error correction decoder to the post processor pinning data indicative of locations of correct bits in the second error corrected bit stream; and, regenerating by the post processor the first error corrected bit stream in dependence on the pinning data; wherein the regenerating comprises discounting bits at the locations indicated by the pinning data and wherein the pinning data is indicative of locations and values of correct bits in the second error corrected bit stream;

supplying the pinning data from the error correction decoder to the detector in the event that the checksum is indicative of errors in the second error corrected bit stream and the second error corrected bit stream comprises at least one correct interleave; and regenerating by the detector the output bit stream in dependence on the pinning data;

wherein the regenerating of the first error corrected bit steam is performed in dependence on the pinning data and the regenerated output stream.

* * * * *